(12) United States Patent
Zhuang

(10) Patent No.: US 6,590,843 B1
(45) Date of Patent: Jul. 8, 2003

(54) DVD RADIAL RUNOUT CANCELLATION WITH SELF-CALIBRATION

(75) Inventor: John Zhuang, Irvine, CA (US)

(73) Assignee: Texas Instruments Incorporated, Dallas, TX (US)

(*) Notice: Subject to any disclaimer, the term of this patent is extended or adjusted under 35 U.S.C. 154(b) by 0 days.

(21) Appl. No.: 09/323,498

(22) Filed: Jun. 1, 1999

Related U.S. Application Data

(60) Provisional application No. 60/087,749, filed on Jun. 2, 1998.

(51) Int. Cl.[7] .............................................. G11B 7/095
(52) U.S. Cl. .................................. 369/44.32; 369/53.14
(58) Field of Search ............................ 369/44.32, 53.14

(56) References Cited

U.S. PATENT DOCUMENTS

| | | | |
|---|---|---|---|
| 4,764,914 A | * 8/1988 | Estes et al. | 360/77.04 |
| 5,010,535 A | * 4/1991 | Davis | 360/77.02 |
| 5,121,374 A | * 6/1992 | Barton et al. | 369/44.29 |
| 5,617,388 A | * 4/1997 | Ishioka et al. | 360/77.04 |
| 5,742,573 A | * 4/1998 | Hajjar et al. | 369/44.32 |
| 6,118,739 A | * 9/2000 | Kishinami et al. | 369/44.28 |
| 6,137,753 A | * 10/2000 | Grimsley | 360/75 |

* cited by examiner

*Primary Examiner*—W. R. Young
(74) *Attorney, Agent, or Firm*—W. Daniel Swayze, Jr.; W. James Brady; Frederick J. Telecky, Jr.

(57) ABSTRACT

A self-calibrating radial runout cancellation method for DVD optical disc media. The radial runout of an optical disc is first measured, during closed-loop tracking, for amplitude and phase. During tracking, a sine wave corresponding in phase and amplitude to the radial runout of the optical disc is synthesized. This sine wave is used in a feed-forward configuration to precompensate for the radial runout of the optical disc.

13 Claims, 9 Drawing Sheets

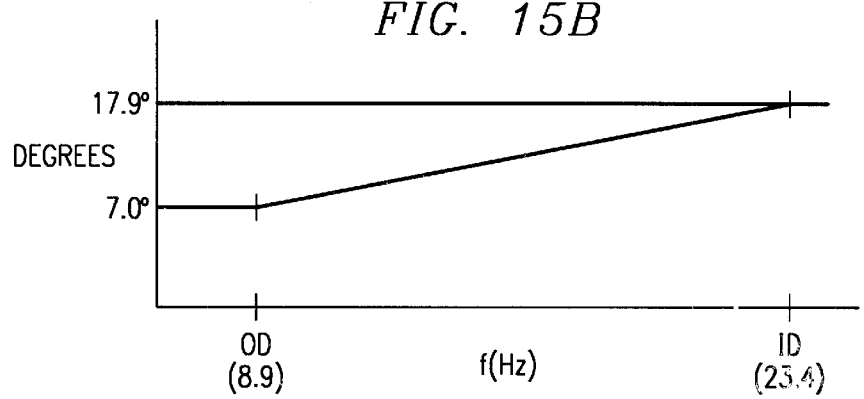
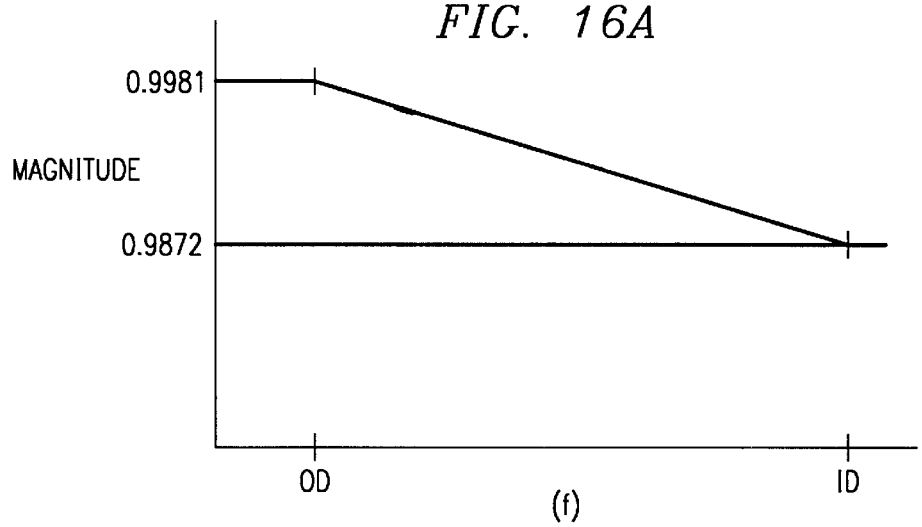
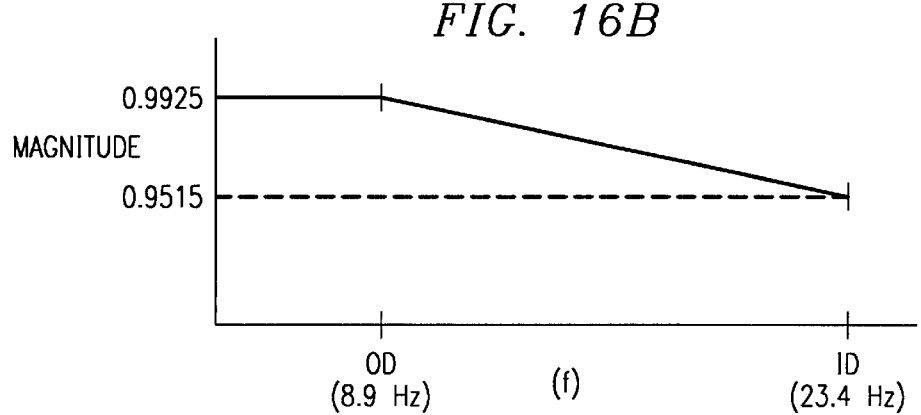

DVD RADIAL RUNOUT CANCELLATION WITH SELF-CALIBRATION

This application is a continuation of application Ser. No. 60/087,749, filed Jun. 2, 1998.

BACKGROUND AND SUMMARY OF THE INVENTION

The present invention relates to control of DVD drives, particularly to cancellation of radial runout of an optical disc by applying a precompensating predicted radial runout signal to the DVD optical disc tracking apparatus.

Background: DVD

DVD is an optical disc format known alternately as Digital Video Disc and Digital Versatile Disc. The optical disc employed with the DVD format is the same size as the traditional compact disc used in audio CD and CD-ROM applications. However, the capacity of the DVD optical disc is, at a minimum, more than seven times that of an audio CD or CD-ROM. Additionally, the data transfer rate of the DVD format is approximately six times that of the audio CD format. This increase in capacity and transfer rate allows the DVD format to provide for a wide variety of applications.

The DVD format can be used for video, data storage, audio applications, and interactive videos, games, etc. Moreover, the DVD format allows each of these applications a greater flexibility than they would otherwise have under conventional video or audio CD formats or CD-ROM. In video, the resolution offered by the DVD format is much closer to the source video, at 720 pixels per horizontal line, than the VHS standard of 320 pixels per horizontal line. The DVD format also offers Dolby Pro Logic or AC-3 and MPEG-2 audio formats on up to eight separate soundtracks. Other features offered by the DVD format are multiple subtitle tracks and multiple video aspect ratios all on the same disc.

Additionally, DVD-ROM drives used in computers and home DVD players are fully capable of extracting the data from, or "playing", discs formatted in the current audio CD and CD-ROM formats. DVD-ROM drives require increased seeking and disc rotation speeds for finding and reading the data stored on the optical disc more quickly than is required for home DVD player use. As stated above, the data transfer rate standard for DVD players is only six times that of audio CDs. However, CD-ROM drives currently read data at over twenty-four times the data transfer rate of audio CDs. To be competitive in the computer market, DVD-ROM drives must be able to access and transfer data at least as quickly as their CD-ROM drive competition. Home DVD players do not currently have the same demands as they are not put to as versatile uses as DVD-ROM drives.

Background: Optical Disc Apparatus

FIG. 2 illustrates a typical optical disc apparatus for reading information from an optical disc. Laser light emitted from a laser diode 202 passes through a beamsplitter prism 204, a collimating lens 206, and a focusing lens 208 that focuses the laser light onto a particular track of the optical disc 212. Laser light reflected from the surface of the disc passes through the focusing lens 208 and the collimating lens 206. The light then reflects off the surface of the beamsplitter prism 204 through a cylindrical lens 210 and finally illuminates a photo-detector array 216. The photo-detector array 216 converts the received light energies into electric signals. The entire apparatus is known as the "pickup". The focusing lens 208 is typically held in a lens holder attached by a spring mechanism to the pickup body. Lens position is controlled by permanent magnets mounted to the pickup body. Wire coils attached to the lens holder carry electric currents that generate magnetic force interacting with the magnets and moving the lens holder relative to the pickup body. Both a focusing coil and a radial coil are used to effect and control focus and radial movement, respectively. The position of the focusing lens is controlled with the lens holder being driven in accordance with the control signals flowing into the focusing and tracking coils.

Background: Tracking

Data on an optical disc is arranged in a concentric or spiral fashion around the disk and a laser beam is positioned such that its beam spot is at the center of the target track. Fine positioning on a particular track of data is achieved by controlling the radial coil of the pickup to move the focusing lens 208 in the direction of the radial axis of the optical disc. However, the tracks of an optical disc are generally not perfectly concentric or do not follow a perfect spiral from the inner to outer diameters of the disc. A combination of factors such as disc decenter (non-concentricity), disk tilt, mounting errors, differential thermal expansion, and variations between disks can cause a radial tracking uncertainty typically exceeding 50 micrometers. At a typical pitch of 0.74 micrometers per track, this uncertainty averages ±67 tracks.

Background: Servos

The function of a servo system is to minimize the pickup position error with respect to the track on the optical disc currently being read. Open-loop servos achieve radial tracking by using a stepper motor. The pickup is moved a calculated distance toward or away from the center of the data media along its radial axis. The relatively large space between the tracks on data media such as floppy disc drives and low-capacity Winchester drives allows for tracking using the coarse adjustment of stepper motors. However, the tight track tolerance of optical disc media makes open-loop tracking impractical. Therefore, optical drives use closed-loop tracking servos. Closed-loop servos are designed to compensate for unpredictable positioning errors in order to achieve accurate focusing and tracking of optical disc media. In a closed-loop positioning servo, an optical sensor samples the light reflected from the surface of the optical disc and generates a signal proportional to the tracking error. The signal is amplified to a level that can drive a motor that holds the focusing lens 208. The motor moves the lens in the direction that reduces the error signal, thereby improving the tracking.

FIG. 4 depicts a block diagram of a closed-loop servo system. A signal, $y_0$, proportional to the location of the pickup subtracted at node 104 from the radial location of the track being read 102, is generated by a controller 106 which acts as a tracking sensor. If the ideal pickup location does not coincide exactly with the zero-crossing of the controller's 106 s-curve, an offset bias 408 is added at node 108 to the signal, $y_0$, to create signal $y_2$. The filter and amplifier circuits 404, translate $y_2$ into a signal to control the motion of the pickup. The radial actuator 114 applies this signal to the pickup, reducing the residual error. The radial actuator 114 also supplies the signal 120 indicating the location of the pickup to node 104.

The performance of the closed-loop servo can be enhanced by several digital control techniques. Most notably, since tracking errors due to disc decenter or disc tilt are periodic, they can be sampled and fed back to the servo on a time-varying bias.

Background: Radial Runout

Radial runout is defined as the peak-to-peak radial motion of a track relative to the rotation axis. Changes in track radii of optical discs are difficult to control. Such changes can occur due to thermal expansion, centrifugal strain, or plastic deformation. These changes create positional uncertainties in optical discs which are just as great as those in ordinary disk drives. However, unlike ordinary disk drives, in optical drives these changes are not smaller than the track pitch. As a result of this characteristic, the track address for each track must be read directly from the headers of the tracks themselves. Consequently, the absolute radial position of tracks on an optical disc need not be controlled very precisely. This arrangement allows for changes in the track radii of an optical disc to be tolerated as long as the changes themselves are radially symmetric. Most radial runout is due to track decenter, or non-concentricity. Track decenter includes imprecise centering of the track pattern on the optical disc. (The largest contributor to decentering error is centering error between the disc and the spindle.) Generally, tracks on the optical disc are equally decentered. Therefore, the radial runout of the optical disc is essentially independent of its radius.

Background: Radial Access

The advantage of radial access is in its ability to quickly locate a particular file on a particular track of the optical disc. The accuracy of such access is important. Merely approximating the track location can result in delay as the total access time is increased while waiting for the desired track to be found. In open-loop systems, the position of the desired track can be found based on its approximate distance from the center of the disc. However, optical discs must rely on track counting because the pitch of the tracks, even though their concentricity is relatively the same as that of open-looped systems, is much too fine for distance measurements approximated with stepper motors to be used. The zero-crossing of tracking error signals that occur during radial access can be used to count tracks as they are crossed. Such counting ensures that the pickup will come to rest on the desired track and be able to access it immediately.

Radial runout complicates the track counting procedure. However, radial runout can be overcome by measuring the track decenter relative to the rotation axis while the pickup is fixed. FIG. 5 depicts radial runout of approximately ±3 tracks. Approximately four tracks separate track 502 from track 504. A pickup fixed along the rotational axis would sense approximately twelve track crossings during one revolution (or period) of the optical disc. The error signal is periodic with two separate groups of error pulses per rotation. Each track within the runout range creates one cycle of the tracking-error signal as it passes outside the pickup radius and again as it passes inside. The decenter of the optical disc is equal to the number of cycles divided by four. At the two turn-around points 506 and 508, the pickup velocity, relative to a track of the optical disc, momentarily reaches zero and the signal flattens out. These points appear to divide the error signal into distinct groups of pulses per revolution.

In a related copending application entitled "Using Radial Runout Cancellation to Reduce Tracking Error in CD/DVD Systems" Ser. No. 09/082,999, filed May 21, 1998; radial runout cancellation is achieved using open-loop calibration. FIG. 12 depicts a block diagram of a tracking servo system. The track error detector circuit 1202 outputs a tracking error (TE) signal to the radial runout detector 1204 and the output-feedback controller 1206. The MIRR generator 1208 outputs a mirror crossing signal, MIRR, to the radial runout detector 1204. The track error detector 1202 outputs a track crossing signal, TZC, to the radial runout detector 1204. The radial runout detector 1204 computes the actual and apparent runouts of the optical disc using the mirror and track crossing information. These are input into a runout calculator 1210. The disk orientation detector 1212 detects the rotation phase of the disk and outputs a signal to the runout calculator 1210. After a determination of the frequency and magnitude response of the radial actuator 1214, the runout calculator 1210 calculates the amplitude and the phase of a sinusoidal signal to make the lens motion exactly follow the radial runout of the optical disc. The signal, U2, is output from the runout calculator. The output from the output feedback controller, U1, is summed with U2 at node 1216. The result is input to the radial driver 1218. The radial driver 1218 translates its input into a motion signal, TD, for the radial actuator 1214. The output of the radial actuator, $X_A$, is the radial displacement of the beam spot. The difference between $X_A$ and the radial displacement of the track, $X_R$ is found at node 1220. This difference, $X_E$, is the relative radial displacement of the beam spot from the track center. $X_E$ is connected to feedback to the track error detector 1202.

However, runout makes the relative velocity between the track and the pickup ambiguous, which in turn can create a difficulty, in deciding which zero-crossings correspond to track-centers and the direction of the track centers relative to the pickup. Consequently, the track count can become inaccurate. Additionally, a formatted track does not usually contain a completely continuous tracking groove. Formatted tracks can include blanks, preformatted headers with blank intervals, and disk defects. Such blanks can also result in a loss of track count if the length of the gap is at or greater than the time spent by the pickup in crossing each track.

Radial Runout Cancellation

The present application discloses a method of radial runout cancellation which overcomes the problems of tracking introduced by non-concentricity. The disclosed radial runout cancellation method provides a predictive signal in a feed-forward state to the closed-loop servo system. The signal is used to provide a faster tracking response by precompensating for disc non-concentricity.

Radial runout cancellation is achieved by synchronizing a sine wave with the spin rate of the optical disc drive motor. The amplitude (or "magnitude") and initial phase of the sine wave are calibrated to the magnitude of the radial runout of an optical disc in the optical disc drive and the phase of the radial runout of the disc, respectively. Calibration is performed in closed-loop tracking, with the motion of the pickup, filtered for fine adjustments, providing the magnitude and phase information. Resolution of the sine wave is achieved by using spindle Hall effect sensors to determine the position of the motor. This radial runout signal is applied to a pickup positioning signal in order to precompensate for and thus cancel out radial runout caused by nonconcentricity of the optical disc.

One of the advantages of this method of radial runout cancellation is that tracking of the disc is improved. This results in a greater signal to noise ratio for the data read from the disc.

BRIEF DESCRIPTION OF THE DRAWINGS

The disclosed inventions will be described with reference to the accompanying drawings, which show important sample embodiments of the invention and which are incorporated in the specification hereof by reference, wherein:

FIGS. 15A and 15B depict graphs of the phase loss in degrees experienced between the ID and OD of the optical disc for low-pass filters 116 and 118, respectively.

FIGS. 16A and 16B depict the magnitude response due to the two low-pass filters 116 and 118, respectively, for a 1x DVD player or recorder.

DETAILED DESCRIPTION OF THE PREFERRED EMBODIMENTS

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Feed-Forward Radial Runout Cancellation

Figure 1:
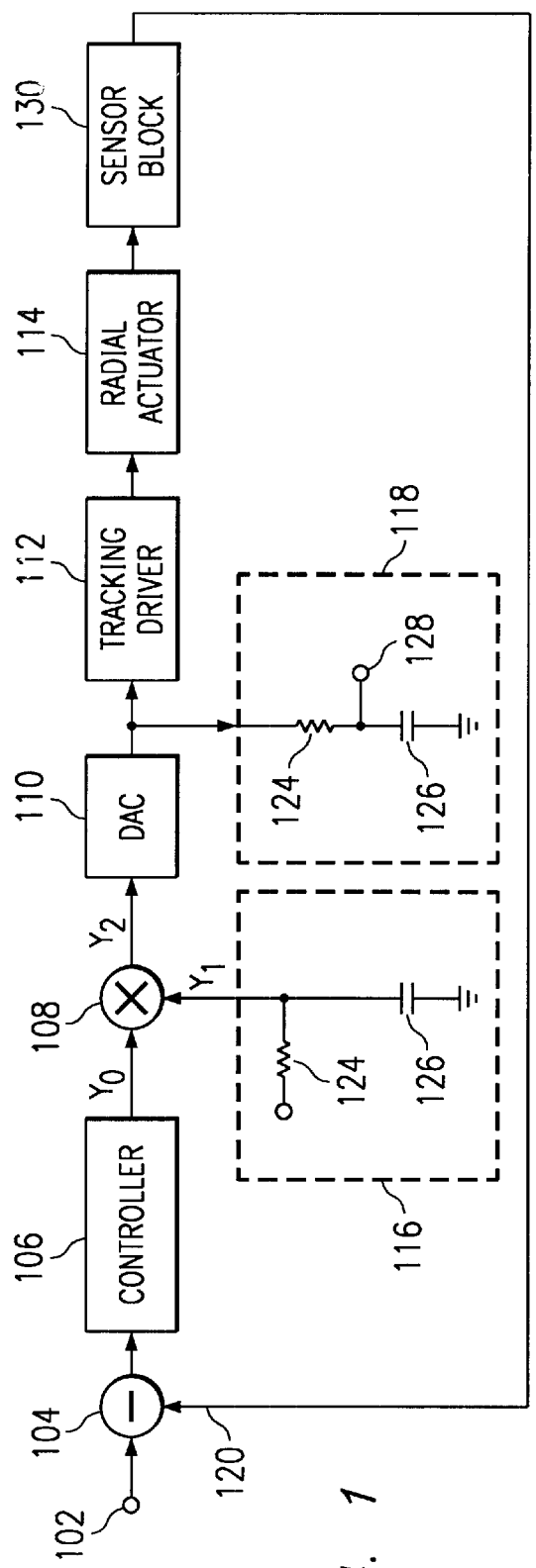
FIG. 1 depicts the presently preferred embodiment for self-calibration of radial runout cancellation of an optical disc.
Figure 4:
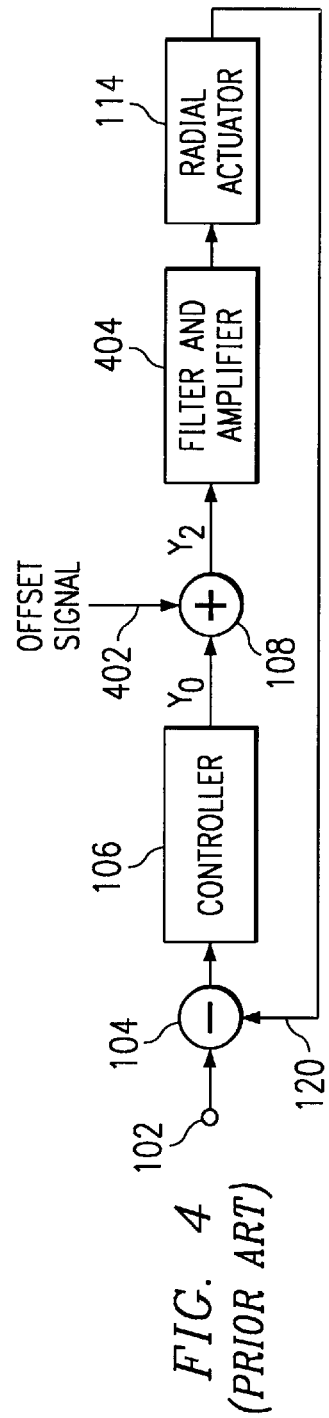
FIG. 4 depicts a block diagram of a closed-loop servo system.
Figure 2:
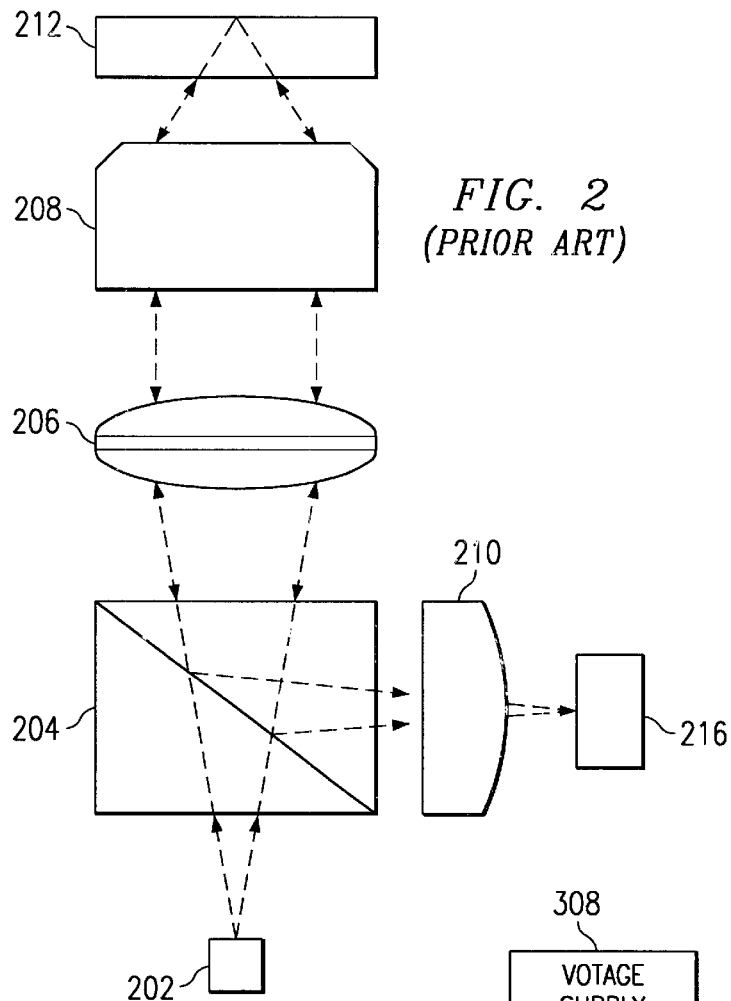
FIG. 2 illustrates a typical optical disc apparatus.

FIG. 1 depicts the presently preferred embodiment of the closed-loop servo system for radial runout cancellation of an optical disc. A tracking error signal 120 is generated at sensor block 130 indicating the location of the pickup along the radial axis of the optical disc in the drive. In the presently preferred embodiment, the sensor block 130 is responsible for optical to electrical position error conversion and is implemented in a programmable processor such as the Silicon Systems 33P3725. The signal 120 indicates the accuracy of the tracking of the optical disc. The signal 120 is subtracted at node 104 from a zero reference signal 102, produced by the tracking system. The result is a net position error signal. A controller 106 acting as a tracking sensor receives the net position error signal and produces a signal, $y_0$.

A sine wave, $y_1$, is digitally synthesized in stage 116. This synthesized wave corresponds closely in amplitude and phase to the radial runout due to non-concentricity of the optical disc. The wave is added at node 108 to $y_0$, in a feed-forward state, to precompensate for the predicted radial runout of the optical disc. The resulting digital signal, $y_2$, is converted to analog at DAC 110. The tracking driver 112, receives the signal and translates it into a motion signal for the radial actuator 114. The output of the radial actuator 114 is connected to a sensor block 130 which generates the tracking error signal 120 which is connected to feedback into the closed-loop positioning servo system. The radial actuator also controls the movement of the pickup. Fine adjustment can be carried out by movement of the focusing lens 208 of the pickup. Coarse adjustments of more than a few tracks require a sledge kick, that is, movement of the entire pickup.

In the presently preferred embodiment, the digital sine waver is generated by a digital signal processor (DSP), such as that contained in the Silicon Systems 33H3825 and passed through a low-pass filter also implemented in a DSP. In the presently preferred embodiment, the low-pass filter 116 has a 3 dB cutoff at a frequency≈144 Hz. The synthesized sine wave is generated such that it will be phase aligned and amplitude calibrated with a frequency synchronized with the rotation of the spindle of the DVD unit. Given a single speed (or 1x) DVD player or recorder, the low-pass filter of the DSP is equivalent to a resistor 124 e.g., a 5 Kohm resistor, and a capacitor 126 e.g., a 0.22 microfarad capacitor. The low-pass filter is used to smooth the synthesized sine wave that corresponds in initial phase to the radial runout of the optical disc. Single speed disc players spin at approximately 570 rpm. However, spin rates of 1600 rpm and higher are possible. At higher spin rates, above 1x, the cut-off frequency of the low-pass filter must be adjusted to generate the proper digital sine wave. For example, the 3 dB cutoff frequency of low-pass filter 116 is doubled from 144 Hz to 288 Hz when the DVD unit is running at 2x, or twice normal speed.

Optical Drive Motor

Figure 3:
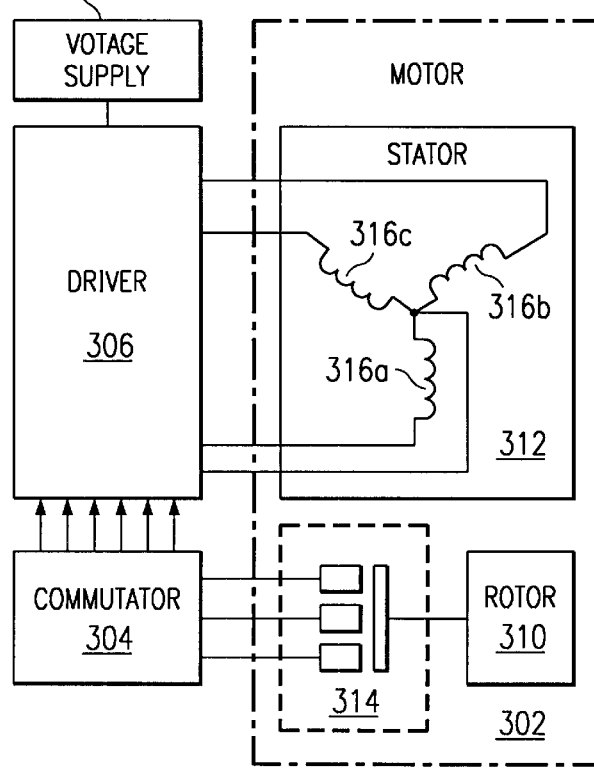
FIG. 3 depicts the architecture of a brushless DC motor.
Figure 5:
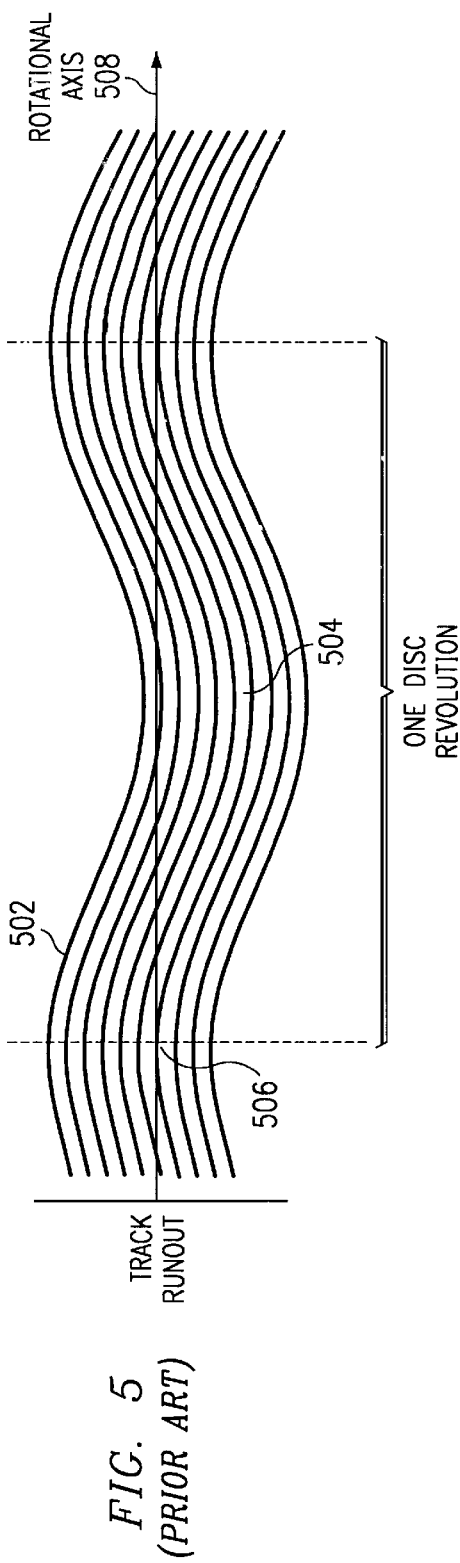
FIG. 5 depicts radial runout of an optical medium.

In general, brushless DC motors are used for rotating data media such as optical discs. Three-phase motors, in particular, are favored for use in computer-related applications because they are low weight, reliable, and accurate. FIG. 3 depicts the architecture of a brushless DC motor. This architecture includes a motor 302, a commutator 304, a driver 306, and a voltage supply 308. The motor 302 includes a rotor 310, a stator 312, and hall effect sensors 314. The stator includes stator coils 316a, 316b, and 316c configured in a "Y" configuration. In operation, the commutator 304 sequentially selects the appropriate stator coil driver circuit in the driver 306 to drive current into or out of stator coils 316a, 316b, and 316c. Hall effect sensors 314, in combination with rotor 310 provide the position information necessary so that the commutator 304 can commutate the driver circuit at the appropriate time.

Resolution of the Sine Wave

Figure 6:
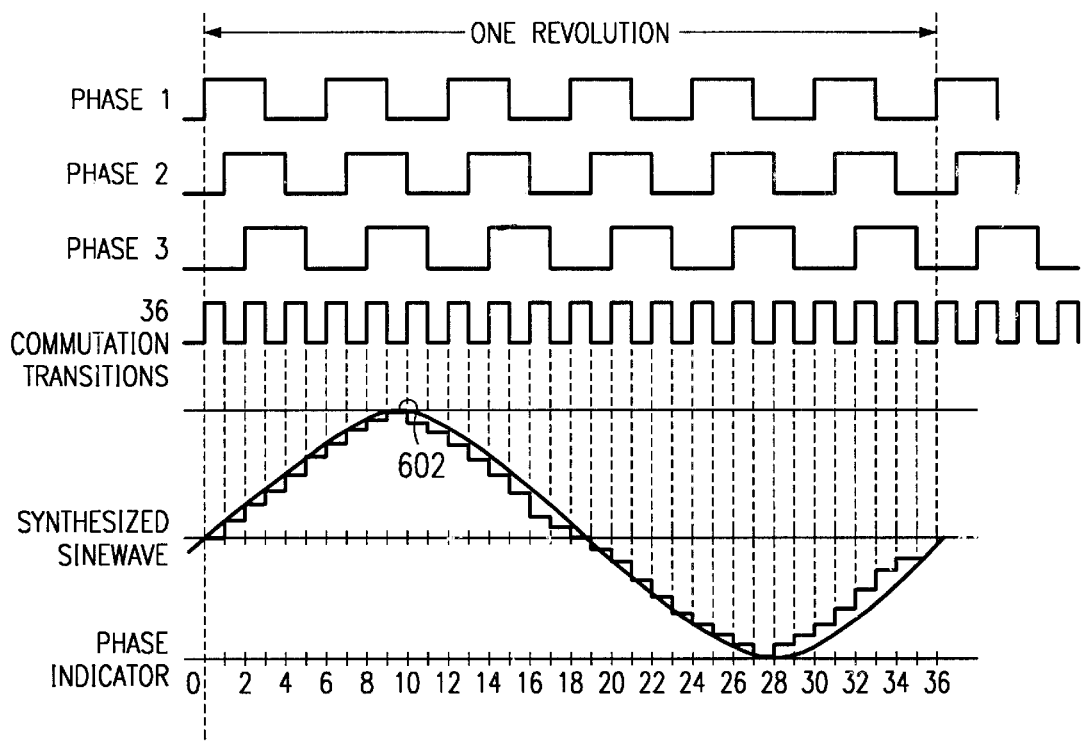
FIG. 6 depicts the 36 commutation transitions per spindle revolution created by a three phase DC motor with three pairs of spindle Hall effect sensors.

In the presently preferred embodiment, the sine wave produced for radial runout cancellation is resolved and kept in synchrony with the rotation of the optical disc by the use of spindle Hall effect sensors on the motor driving the optical disc. FIG. 6 depicts the thirty-six commutation transitions per spindle revolution created by the three phase DC motor with three pairs of spindle Hall effect sensors described in FIG. 3. In the presently preferred embodiment, these transitions are detected for use by the sine wave generator in an integrated circuit (or "IC") device such as the SSI 33H3825 produced by Silicon Systems, Inc. This transition information is used to update the sine wave output. Given a particular transition, the sine wave generator makes use of a look up table to determine the value of the signal to generate at a given time. The thirty-six transitions cover 10 degrees each. At each spindle transition the output of the sine wave is updated based on a value held in the look-up table. Therefore, the synthesized sine wave will correspond with the radial runout of the optical disc to within ±5 degrees.

Initially, the synthesized sine wave starts from an arbitrary spindle transition and has maximum amplitude e.g., 1. During self-calibration, the spindle transition which indicates phase 0 is located to within ±5 degrees. The sine wave can then be synthesized to match the radial runout in frequency, amplitude, and phase.

Alternative Embodiment: Finer Sine Wave Resolution

Figure 13:
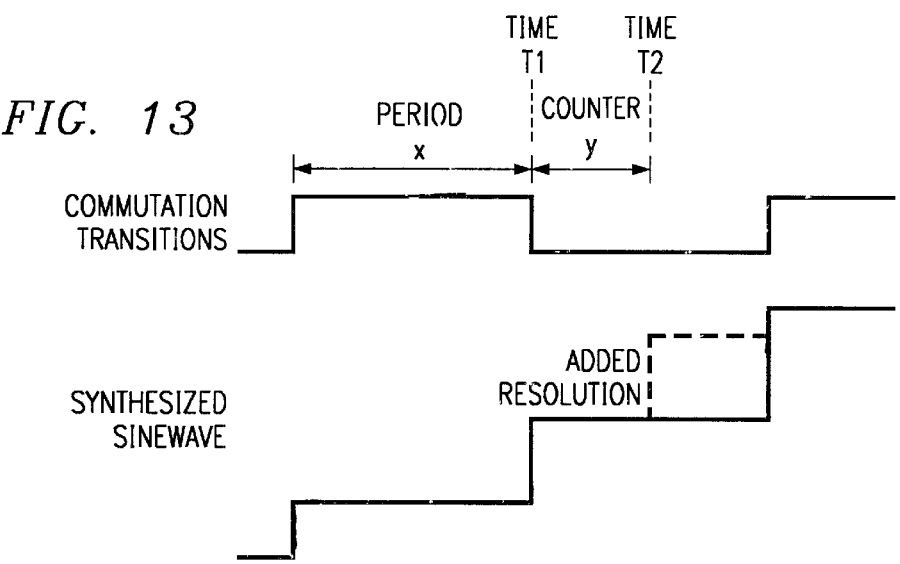
FIG. 13 depicts a diagram of commutation transition pulses in relation to the synthesized sine wave.

In an alternative embodiment, finer resolution of the sine wave can be accomplished through interpolation. In the presently preferred embodiment, the synthesized sine wave updates to a new value at each commutation transition with ±5 degrees of resolution. FIG. 13 depicts a diagram of commutation transition pulses in relation to the synthesized sine wave. In order to increase the resolution, a software counter, x, is used to record the period of adjacent commutation transitions. Another software counter, y, is used to generate intermediate pulses, adding resolution to the synthesized wave. The phase increment from time $t_1$ to time $t_2$ is represented by $10*y/x$. The sine wave value at time $t_2$ is represented by:

sin(phase1+Δphase)=sin(phase1)cos(Δphase)+
cos(phase1)sin(Δphase)

where sin(phase1) and cos(phase1) are known. A simple use of this technique is doubling or quadrupling the resolution of the synthesized wave. For example, to double the resolution, once the value of the counter y reaches half of the value of x, a new sine value is generated. The sine values come from a reference source such as a lookup table.

In the presently preferred embodiment, a clock set to generate 10 pulses for each of the 36 commutation transitions would increase the resolution of the sine wave to a fractional phase of ±½ degree. This fractional phase, reset at the start of each radial runout cycle can be used by the sine wave synthesizer to generate a more precisely timed sine wave for radial runout cancellation.

Self-Calibration for Radial Runout Cancellation

To achieve radial runout cancellation due to optical disc nonconcentricity, the magnitude of the radial runout and the initial phase of the non-concentricity must first be determined.

In the presently preferred embodiment, calibration for radial runout cancellation is performed in an IC device such as the SSI 33H3825 DSP at the time an optical disc is inserted into the system or when the system, already containing an optical disc, is activated. (This is known as "launch"). Once normal closed-loop tracking of the optical disc has commenced, that is focus and tracking is achieved but "sledge kicking" is not engaged, the output of the digital-to-analog converter (DAC) 110 and filter 118 can be sampled to provide both the radial runout of the optical disc and its initial phase. If the magnitude of the radial runout of the optical disc is great, tracking calibration at normal high speeds may not be achievable. However, the disk can be rotated at a lower spin rate, enabling tracking and runout calibration. Spinup to a normal high spin rate can then take place, with the calibrated runout used for tracking.

Calibration is aided by the use of a digitally implemented low-pass filter 118. In the presently preferred embodiment, the low pass filter 118 has a 3 dB cutoff at a frequency≈72 Hz. Low-pass filter 118 has a lower cutoff frequency than low-pass filter 116 because filter 1116 has a smaller phase loss variation from ID to OD. Only filter 116 is used during actual cancellation of radial runout. The low-pass filter 118 is implemented in a DSP and is equivalent to a resistor 124 e.g., a 10 Kohm resistor and a capacitor 126, e.g., a 0.22 microfarad capacitor. The filter 118 is applied to the command signal output of DAC 110 to obtain a radial runout signal. The filter 118 filters out the RF noise caused by fine tracking adjustments leaving a tracking signal indicating the radial runout of the optical disc at output 128. This signal is in the form of a sine wave synchronized with the motion of the spindle of the optical drive and including a very slow DC drift. The amplitude and phase of this signal 128 indicate the amplitude and initial phase of the radial runout for synthesizing the sine wave during tracking.

The synthesized sine wave generated needs to be calibrated to closely match the amplitude and phase of the radial runout. To do this, the DSP samples the radial runout signal and locates its top peak 602. Once this top peak 602 is located, the phase of the synthesized sine. wave can be aligned with that of the radial runout signal, within ±5 degrees.

The low-pass filter 118 will result in loss of phase. Compensation for any phase loss due to the low-pass filter must occur at generation of the radial runout cancellation sine wave in order to ensure proper phase of the precompensation signal. Loss of phase is different at different frequencies. The linear spin rate of the inner diameter of an optical disc is slower than that of the outer diameter. Therefore, the sine wave produced by radial runout at the inner diameter, can have a frequency of, for example, 23 Hz, while the outer diameter can have a frequency of, for example, 9 Hz. The magnitude of phase loss for which corrections must be made is lower for the outer diameter than the inner diameter.

Phase loss caused by the two low-pass filters 116 and 118 is predictable and correctable. The transfer function of filter 116 is represented by:

$$H(s) = \frac{1}{1+s \cdot RC} = \frac{1}{1+1.1 \times 10^{-3} s}$$

The transfer function of filter 118 is represented by:

$$H(s) = \frac{1}{1+s \cdot RC} = \frac{1}{1+2.2 \times 10^{-3} s}$$

Figure 15A:
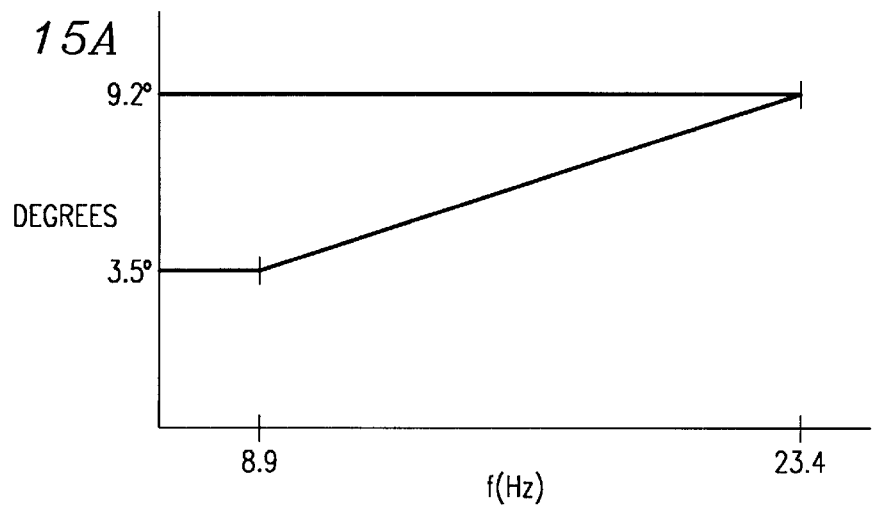

A 1x DVD will create a radial runout sine wave with a frequency of ≈23.4 Hz near the inner diameter (ID) of the optical disc and ≈8.9 Hz near the outer diameter (OD) of the optical disc. FIGS. 15A and 15B depict graphs of the phase loss in degrees experienced between the ID and OD of the optical disc for low-pass filters 116 and 118, respectively. If for filter 116, as in the presently preferred embodiment, R is 5 Kohms and C is 0.22 microfarads, the total phase loss is 9.2 degrees. If for filter 118, as in the presently preferred embodiment, R is 10 Kohms and C is 0.22 microfarads, the total phase loss at ID is 17.9 degrees. For both filters, 116 and 118, the loss is 27.1 degrees for ID and 10.5 degrees for OD. As depicted in FIG. 6, the top peak 602 of the synthesized sine wave occurs at spindle transition 9.5, or at 95 degrees instead of 90 degrees (10 degrees per spindle transition given 36 transitions per revolution). This 5 degree phase loss occurs independently of the radial position of the pickup. Therefore, the synthesized sine wave itself incurs a phase loss of 5 degrees. When coupled with the phase loss due to low-pass filters 116 and 118 the total phase loss at ID is 32.1 degrees and at OD is 15.5 degrees.

Since, in the presently preferred embodiment, calibration is performed at ID with a speed of 1x, the top peak is set to coincide with spindle phase 5. This setting provides 40 degrees of lead phase to the signal to compensate for phase loss due to the low-pass filters and the offset due to the synthesized sine wave transitions and miscellaneous phase loss.

Figure 14:
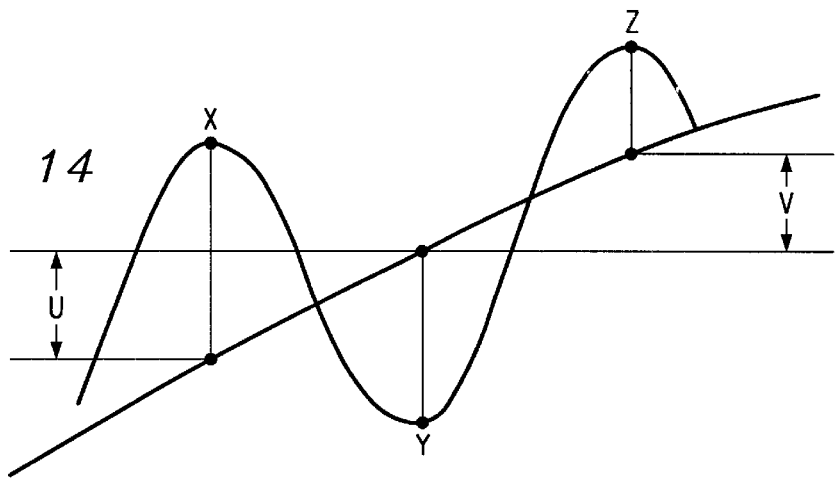
FIG. 14 depicts an example of a radial runout signal with peaks x, y, and z.

The synthesized wave must also be calibrated to closely match the magnitude of the radial runout signal. To do this, the DSP first samples the radial runout signal and locates three consecutive peaks. FIG. 14 depicts an example of a radial runout signal with consecutive peaks x, y, and z. FIG. 14 also depicts the DC drift of the radial runout signal. The peak-to-peak magnitude of the sine wave (plus the DC drift) is given by both x-y and z-y, that is, x-y=magnitude(-u) and z-y=magnitude(+v). With a constant spindle rate and DC offset during calibration, the magnitude of the radial runout signal is given by (x+z-2y)/2. This calibrated magnitude is then used to generate a magnitude aligned synthesized sine wave. The low-pass filter 118 will result in some magnitude attenuation. Compensation for any magnitude attenuation due to the low-pass filter must occur at generation of the radial runout cancellation sine wave in order to ensure proper magnitude of the precompensation signal.

Magnitude attenuation caused by the two low-pass filters 116 and 118 is also predictable and correctable. FIGS. 16A and 16B depict the magnitude attenuation due to the two low-pass filters 116 and 118, respectively, for a 1x DVD player or recorder. For filter 116, the total magnitude attenuation at ID is 0.9872. For filter 118, the magnitude attenuation at ID is 0.9515. In the presently preferred embodiment, the value $1/0.9515*0.9872 \approx 1.06$ is multiplied with the calibrated magnitude value to compensate for magnitude attenuation.

Corrections for both magnitude attenuation and phase loss can also be made based on the OD of the disc or anywhere in between the ID and OD. For such corrections, different values for phase loss and magnitude attenuation, as indicated on FIGS. 15A, 15B, 16A, and 16B must be used.

Figure 7:
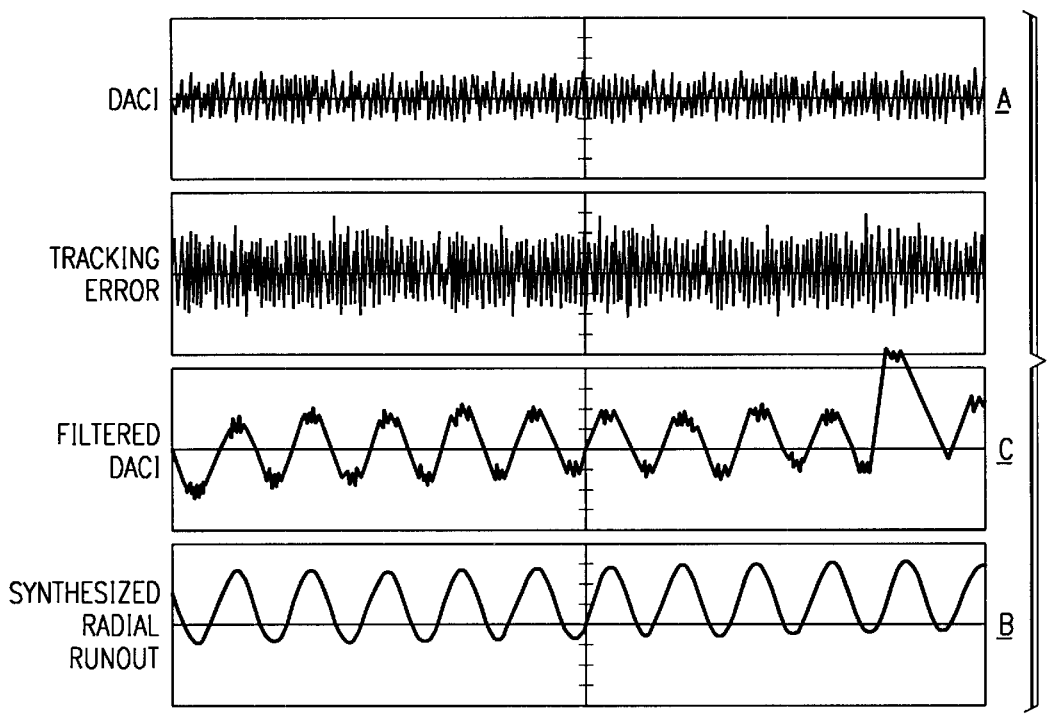
FIG. 7 depicts the various signal outputs of the radial runout cancellation system.

FIG. 7 depicts the output of DAC 110, the tracking error signal 102, the filtered output 128 of DAC 110, and the synthesized radial runout of the optical disc in the system, $y_1$. The filtered output 128 of DAC 110 is used to measure the non-concentricity of the optical disc. The synthesized radial runout is the sine wave generated to correspond with the measured non-concentricity.

Figure 8A:
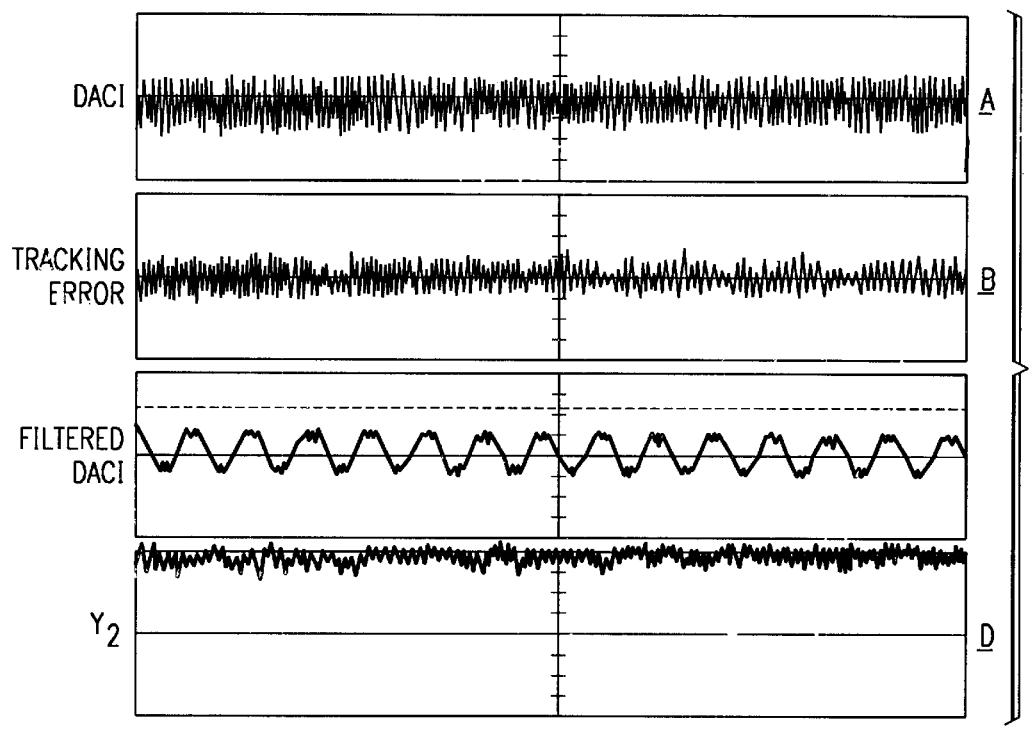
FIGS. 8A and 8B depict the various signal outputs of the radial runout cancellation system.
Figure 8B:
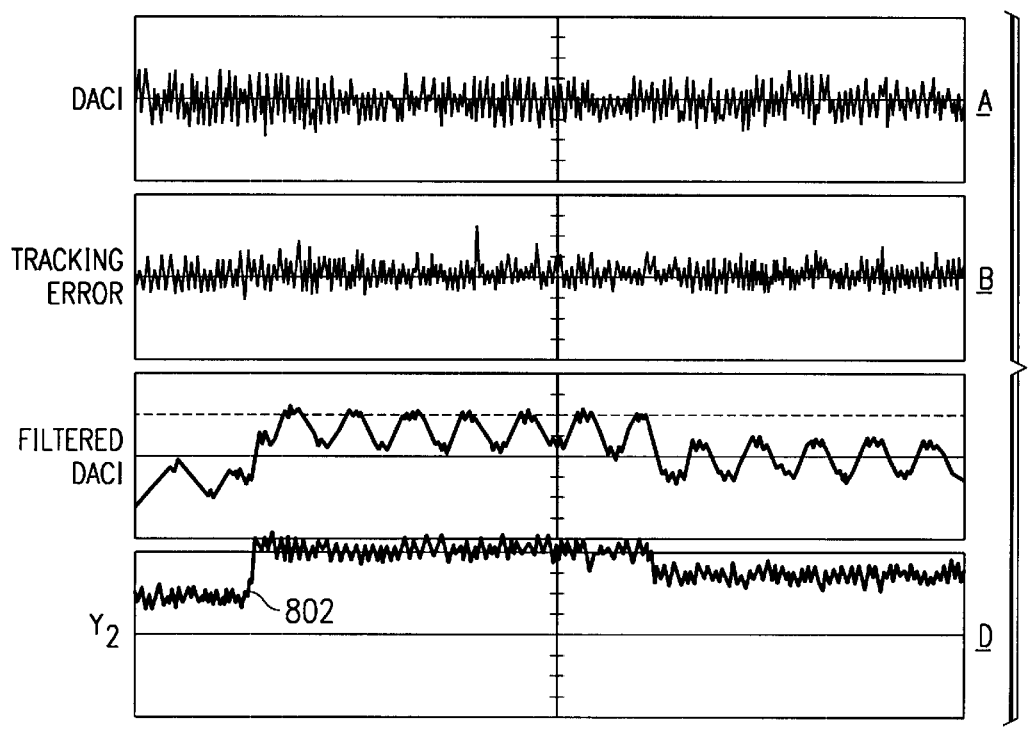

FIGS. 8A and 8B depict the output of DAC 110, the tracking error signal 102, the filtered output 128 of DAC 110 and the controller 106 output, once precompensation of radial runout is achieved, $y_2$. When compared to the synthesized radial runout of FIG. 7, the effect of radial runout cancellation can be seen. The synthesized radial runout of FIG. 7 indicates the wide range of movement the focusing lens of the pickup has to make to remain on track. Conversely, the $y_2$ signal of FIG. 8 shows that much smaller movements are required by the radial actuator 114 to keep the focusing lens 208 on track. The jump 802 in the controller output, $y_0$, indicates a sledge kick coarse adjustment during tracking. As FIG. 8 shows, such sledge kicks can take place without loss of tracking.

DVD Player

Figure 9:
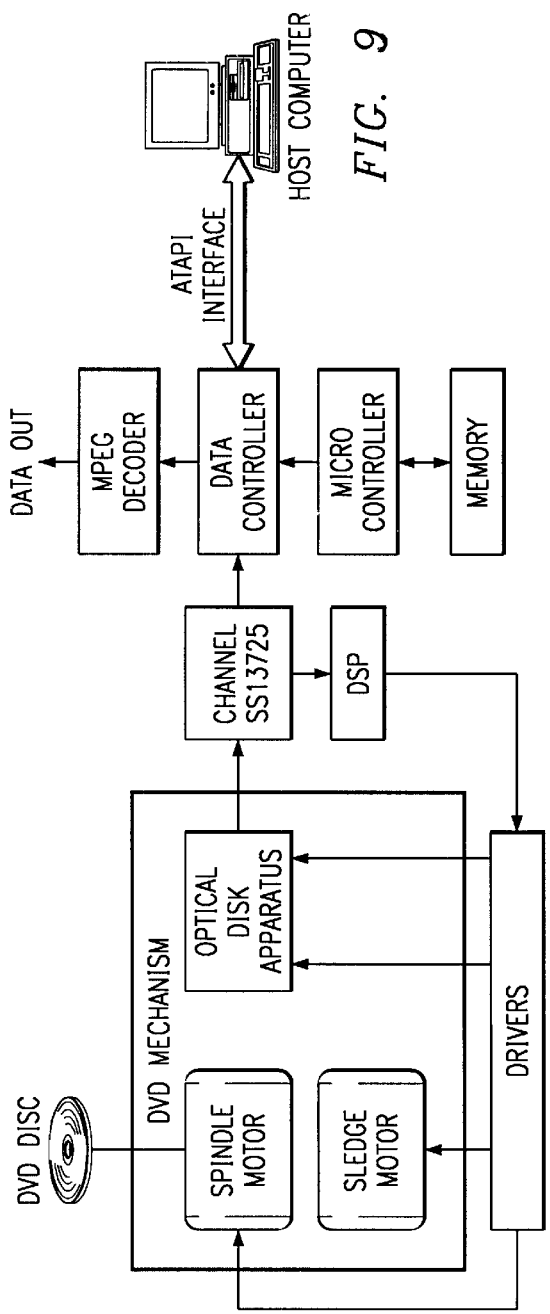
FIG. 9 depicts a block diagram of a DVD Player which can make use of the disclosed method of radial runout cancellation.

FIG. 9 depicts a block diagram of a conventional DVD player which can make use of the disclosed method of radial runout cancellation. The DVD mechanism contains the mechanical components required for driving and reading an optical disc. The pickup receives reflections from the surface of a disc and generates a RF data signal. The channel block is implemented with an IC device, such as the SSI 33P3725 produced by Silicon Systems. The channel is responsible for servo functions, servo data conversion, RF amplification, automatic gain control of the signal, and other DVD control functions.

The channel block interfaces with a DSP and a data controller. The data controller is another IC device, such as the SSI 33C3925 produced by Silicon Systems. The data controller is responsible for data format decoding (CD, DVD, etc.), buffer management, speed control, error correction, and other data handling and management functions. The data controller interfaces with its host computer and is controlled by a microcontroller for varying external interfaces such as IEEE 1394, SCSI, and others. Although the data controller is responsible for data format decoding, data decoding is performed by other devices, such as the MPEG decoder.

Figure 10:
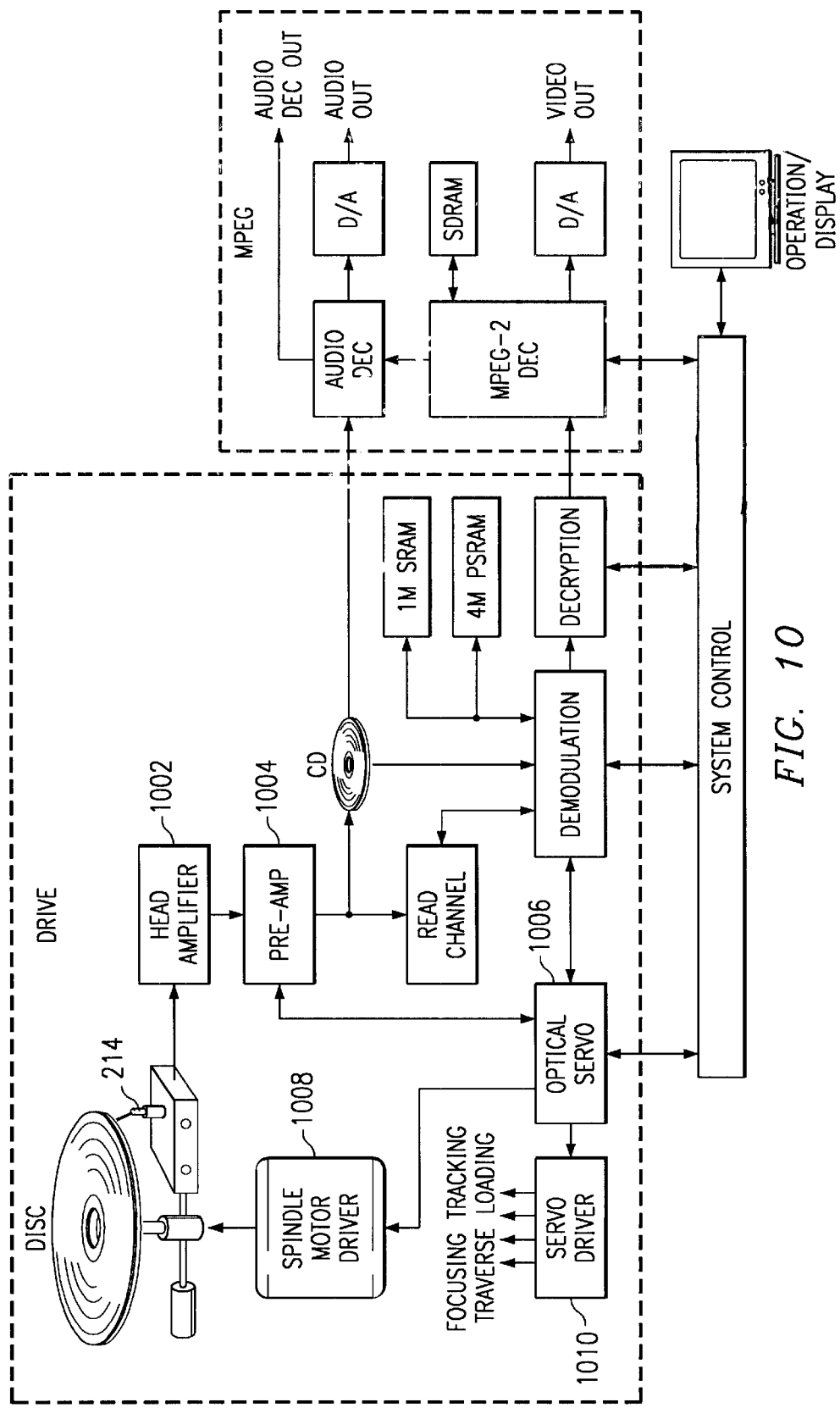
FIG. 10 depicts a system diagram of an example of a DVD player which can utilize the disclosed method of radial runout cancellation.
Figure 11:
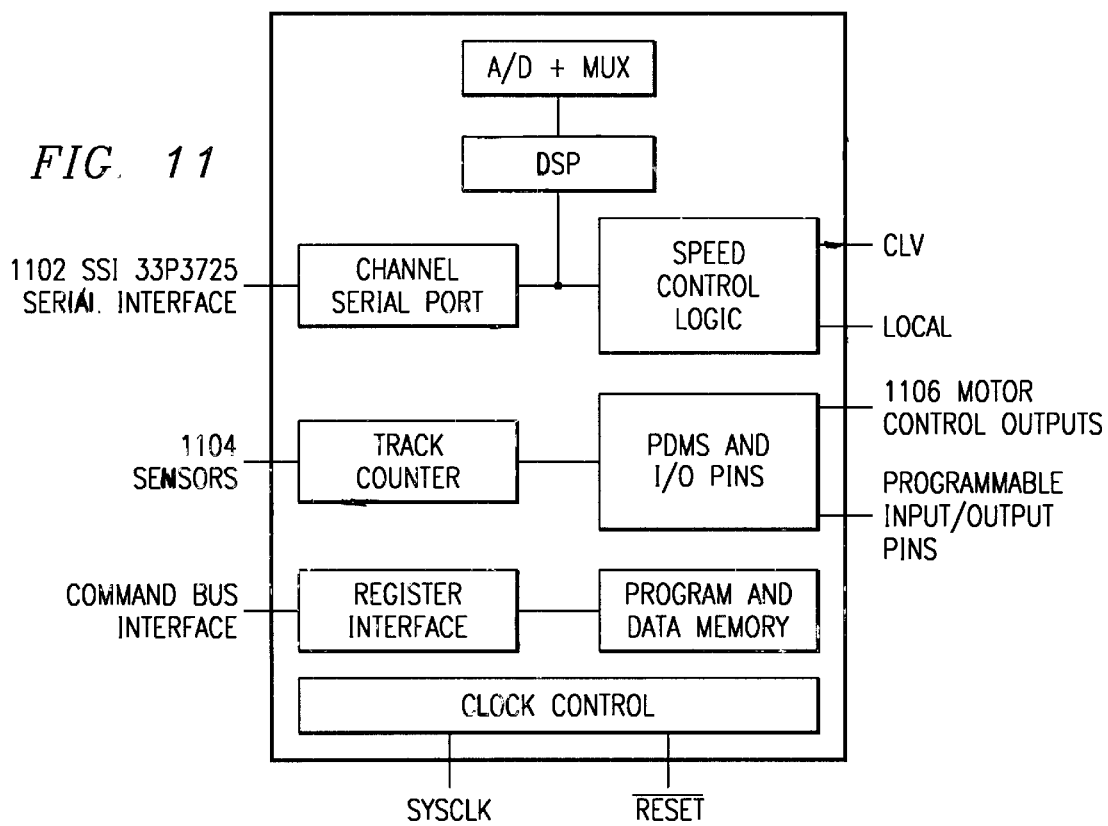
FIG. 11 depicts a block diagram of a typical servo processor DSP.
Figure 12:
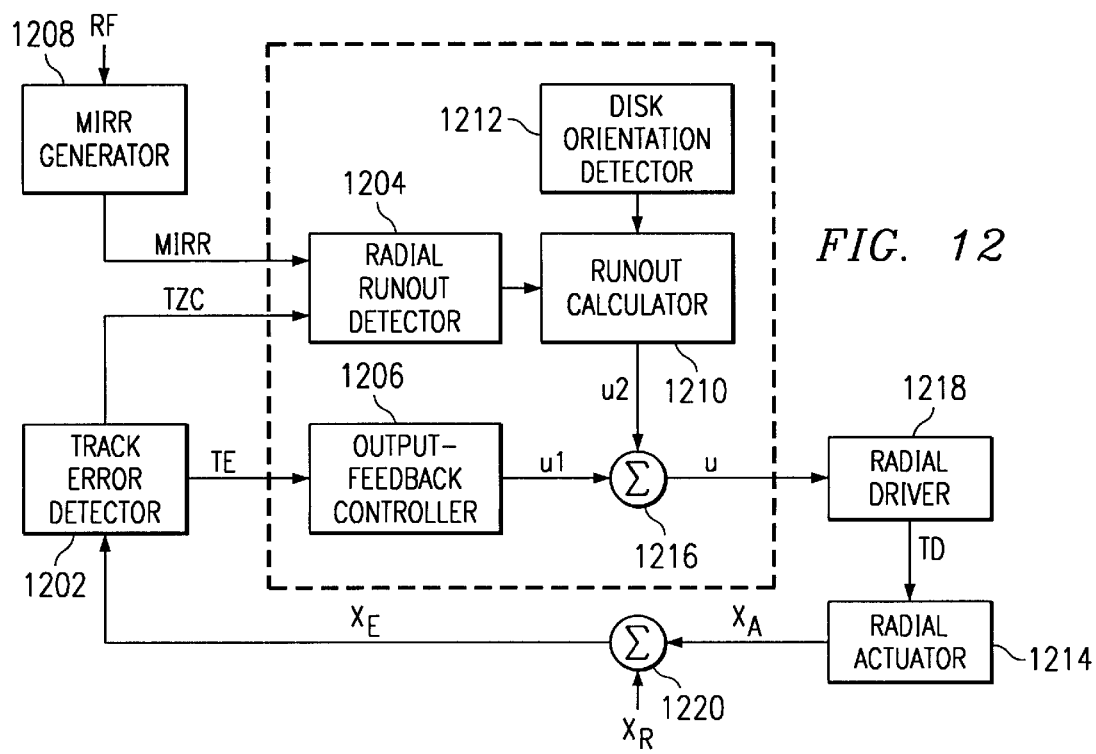
FIG. 12 depicts a block diagram of a tracking servo system.

The channel block also interfaces with a servo DSP processor. The servo DSP processor is an IC device, such as the SSI 33H3825. It is responsible for such functions as control of focus, tracking, radial positioning, and spindle speed. FIG. 11 depicts a block diagram of a typical servo DSP processor. The device is connected to the channel block with a serial interface 1102 and a connection to receive focus and tracking sensor information 1104. This device is responsible for the calibration and sine wave synthesis function of the disclosed radial runout cancellation method. Tracking information is received and precompensation is performed by the DSP. Motor control outputs 1106 are connected to the drivers of FIG. 9, including driver 112. The driver is responsible for controlling the spindle motor for speed control, the sledge motor for coarse tracking control, and the tracking of the focusing lens 208 via a radial actuator 114. The servo DSP processor also includes an analog-to-digital converter with an analog MUX, speed control logic to control the speed of the drive spindle, a command bus interface for various microcontrollers such as SCSI and IEEE 1394, It also includes program and data memory, for storage of values such as the look-up table, which is accessible to all of the servo's functions. FIG. 10 depicts a system diagram of an example of a DVD-ROM drive used in computers which can use the disclosed method of radial runout cancellation. The lens position detection control signal is used to provide focus and tracking control information for the pickup 214. The signals from a photo-detector array are amplified in head amplifier 1002. The signal is then passed to a pre-amplifier 1004. From the preamplifier 1004, the signal can be processed as a data signal or passed to the optical servo 1006 and used for control of the pickup. The optical servo 1006 controls the spindle motor through a spindle motor driver 1008. This motor drives the optical disc and positions the pickup 214. The optical servo passes the photo-detector control signals to a servo driver 1010. The servo driver 1010 controls focus, tracking, traversal of the disc and disc loading operations. It is in the servo driver 1010 that radial runout cancellation is performed.

Data from the optical disc is processed as either audio or video data. If no demodulation of the signal is required, audio data is passed into the MPEG portion of the system. The audio signal is decoded to create a standard digital audio signal and can be passed out as a digital data stream or converted to an analog output. If the signal is data it is passed to the read channel block. The data signal, or the audio signal if required, is then passed to a demodulation block. The signal is then passed to a block where it is decrypted, if necessary. The signal can then be passed to the MPEG portion of the system. The signal is decoded according to the MPEG-2 standard. If the signal is an audio signal, it is passed to the audio decoding block. If the signal is a video signal, it is converted to an analog signal for further use outside the system. The optical servo 1006, demodulation, decryption, and MPEG-2 decoding blocks are controlled by a system controller. The system control also controls the DVD display panel and user operation functions (operation/display block).

Further details of the system context and of options for implementation may be found in Alan B. Marchant, OPTICAL RECORDING, A TECHNICAL OVERVIEW (1990); Jim Taylor, DVD DEMYSTIFIED (1998); TI Datasheets, THE DV25 CHIPSET, SSI 33P3725, SSI 33H3825, AND SSI 33C3925; all of which are hereby incorporated by reference.

Modifications and Variations

As will be recognized by those skilled in the art, the innovative concepts described in the present application can be modified and varied over a tremendous range of applications, and accordingly the scope of patented subject matter is not limited by any of the specific exemplary teachings given, but is only defined by the issued claims.

In the presently preferred embodiment, calibration is performed at launch of the optical disc. However, calibration can be performed periodically during tracking of the optical disc. Additionally, calibration for various points on the disc e.g., tracking points on the optical disc near the inner, outer, and middle diameters, can be performed.

The calibration method described locates the top peak of the radial runout sine wave. However, other points along the sine wave, such as zero crossings, or the bottom peak may also be identified and used for phase calibration.

In the presently preferred embodiment, calibration is performed with a 1x speed DVD unit. However, calibration can be performed at other speeds or for multiple speeds if necessary. Increasing the speed of the DVD unit will necessitate a change in the frequency and other parameters.

Although in the presently preferred embodiment, this method of radial runout cancellation is described in conjunction with optical discs in the DVD format, it is also useful with any optical disc media.

In the presently preferred embodiment, Hall effect sensors are used as spindle position indicators to ensure that the proper phase of the synthesized sine wave is generated. However, other position indicators are available and can be used with brushless DC motors to indicate the timing of the phase to the radial runout cancellation method. These position indicators include, but are not limited to, optical sensors such as light emitting diodes and phototransistors, and inductors sensitive to inductance variation. Sensorless motors can also be used, with back EMFs used as a position indicator.

In the presently preferred embodiment, closed-loop tracking is used to achieve calibration. However, calibration can be also be achieved at launch using open-loop tracking. Open-loop tracking of the optical disc is used to measure the maximum and minimum velocities of the pickup. The velocity measurements are used to establish the amplitude of the sine wave generated to precompensate tracking for the radial runout of the optical disc. The timing of the peak maximum velocity of the pickup is used to determine the initial phase of the sine wave. That is, during closed-loop tracking of the optical disc, the position of the disc at which the generation of the radial runout cancellation sine wave will begin.

It should also be noted that, over time, an increasing number of functions tend to be combined into a single chip. The disclosed inventions can still be advantageous even with different allocations of functions among chips, as long as the functional principles of operation described above are still observed.

What is claimed is:

1. A method of radial runout cancellation, comprising the steps of:

calibrating the closed-loop positioning system of an optical drive for a particular optical medium by:

filtering the output of the positioning controller of said optical drive to obtain the radial runout of said optical medium;

measuring the amplitude and phase of said radial runout; and thereafter tracking a track of said optical medium; and precompensating for said radial runout by:

generating a signal with said amplitude and said phase of said radial runout; and modifying an output of said closed-loop positioning controller servo with said signal;

wherein tracking error due to radial runout is cancelled, and wherein said measuring and generating steps use a low-pass filter and compensation of amplitude and phase loss due to filtering occurs.

2. A method of radial runout cancellation self-calibration, comprising the steps of:

initiating closed-loop focus and tracking of an optical medium in an optical drive;

filtering the output of the positioning controller of said optical drive to obtain the radial runout of said optical medium;

calculating the phase of said radial runout;

calculating the magnitude of said radial runout;

calculating the phase loss of said radial runout due to filtering;

calculating the magnitude loss of said radial runout due to filtering; and storing the results of said calculations;

wherein said results are used to synthesize a sine wave of appropriate phase and magnitude to substantially reduce tracking error due to radial runout.

3. The method of claim 2 wherein said filtering step is performed by a low-pass filter.

4. The method of claim 2 wherein said phase calculating step is performed by locating a point in a cycle of said radial runout.

5. The method of claim 2 wherein said phase calculating step is performed by locating the top peak of a cycle of said radial runout.

6. The method of claim 2 wherein said magnitude calculating step is performed by locating three consecutive peaks of said radial runout.

7. The method of claim 2 wherein the result of said magnitude calculating step is $(x+z-2y)/2$, where x, y, and z are the points of three consecutive peaks, respectively, of said radial runout.

8. The method of claim 2 wherein self-calibration is performed at the inner diameter of said optical medium.

9. The method of claim 2 wherein self-calibration is performed at multiple points along the radial axis of said optical medium.

10. The method of claim 2 wherein said phase loss calculating step and said magnitude loss calculating step each depend on the radial position at which calibration occurs.

11. The method of claim 2 wherein said radial runout is measured at the inner diameter of said optical medium.

12. The method of claim 2 wherein said radial runout is measured at more than one point along the radial axis of said optical medium.

13. The method of claim 2 wherein said radial runout is measured at launch.

* * * * *